US012746655B2

(12) United States Patent
Karlen et al.

(10) Patent No.: US 12,746,655 B2
(45) Date of Patent: Sep. 29, 2026

(54) TOOL BIT FOR AN IMPACT POWER TOOL

(71) Applicant: MILWAUKEE ELECTRIC TOOL CORPORATION, Brookfield, WI (US)

(72) Inventors: Hunter S. Karlen, Hartford, WI (US); Ryan J. Maruszewski, Greenfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 621 days.

(21) Appl. No.: 18/346,330

(22) Filed: Jul. 3, 2023

(65) Prior Publication Data

US 2024/0001522 A1 Jan. 4, 2024

Related U.S. Application Data

(60) Provisional application No. 63/357,719, filed on Jul. 1, 2022.

(51) Int. Cl.
*B25D 17/02* (2006.01)

(52) U.S. Cl.
CPC .......... *B25D 17/02* (2013.01); *B25D 2222/06* (2013.01)

(58) Field of Classification Search
CPC ....... B23B 51/009; B23B 51/00; B23B 51/02; B23B 51/04; B23B 51/08; B23B 27/14; B23B 27/16; B25D 17/02; B25D 2222/06
See application file for complete search history.

(56) References Cited

U.S. PATENT DOCUMENTS 6,102,634 A * 8/2000 Turner .................. E21B 10/445 175/420.1
2006/0222469 A1* 10/2006 Nuzzi ..................... B23B 51/00 408/224
2022/0371105 A1* 11/2022 Novak .................. B23B 51/009

* cited by examiner

*Primary Examiner* — Lee A Holly
(74) *Attorney, Agent, or Firm* — Michael Best & Friedrich LLP

(57) ABSTRACT

A tool bit includes a body formed from a first material and defining an axis of rotation, and a tip coupled to the body and formed from a second material different than the first material. The tip includes a bottom face joined to the body, a front face, a back face opposite the front face, a first side face, a second side face opposite the first side face, and a plurality of top faces opposite the bottom face. The plurality of top faces includes a first top face extending from the first side face toward the axis of rotation and a second top face extending from the second side face toward the axis of rotation. The first top face is perpendicular to the axis of rotation. The second top face is obliquely angled relative to the axis of rotation.

20 Claims, 8 Drawing Sheets

TOOL BIT FOR AN IMPACT POWER TOOL

CROSS-REFERENCE TO RELATED APPLICATIONS

This application claims priority to U.S. Provisional Patent Application No. 63/357,719, filed on Jul. 1, 2022, the entire contents of which are incorporated by reference herein.

FIELD OF THE INVENTION

The present disclosure relates to tool bits, and more particularly to tool bits for impact power tools.

BACKGROUND OF THE INVENTION

Impact power tools such as breakers, hammer drills, and impact drills impart axial impacts to a tool bit while performing a drilling or breaking operation on a work surface. Impact power tools may additionally impart rotation to a tool bit while performing a drilling or breaking operation. Generally, impact power tools include an impact mechanism to impart axial impacts to the tool bit and a transmission to convert the rotation of a motor to impart rotation to the tool bit.

SUMMARY OF THE INVENTION

The present application provides, in one aspect, a tool bit. The tool bit includes a body formed from a first material and defining an axis of rotation, and a tip coupled to the body and formed from a second material different than the first material. The tip includes a bottom face joined to the body, a front face, a back face opposite the front face, a first side face extending between the front face and the back face, a second side face opposite the first side face and extending between the front face and the back face, and a plurality of top faces opposite the bottom face and extending between the front face and the back face. The plurality of top faces includes a first top face extending from the first side face toward the axis of rotation and a second top face extending from the second side face toward the axis of rotation. The first top face is perpendicular to the axis of rotation. The second top face is obliquely angled relative to the axis of rotation.

The present application provides, in another aspect, a tip for use with a tool bit having an axis of rotation. The tip includes a bottom face configured to be joined to the tool bit, a front face, a back face opposite the front face, a first side face extending between the front face and the back face, a second side face opposite the first side face and extending between the front face and the back face, and a plurality of top faces opposite the bottom face and extending between the front face and the back face. The plurality of top faces includes a first top face extending from the first side face toward the axis of rotation and a second top face extending from the second side face toward the axis of rotation. The first top face is perpendicular to the axis of rotation. The second top face is obliquely angled relative to the axis of rotation.

The present application provides, in another aspect, a tip for use with a tool bit having an axis of rotation. The tip includes a bottom face configured to be joined to the tool bit, a front face, a back face opposite the front face, a first side face extending between the front face and the back face, a second side face opposite the first side face and extending between the front face and the back face, a plurality of top faces opposite the bottom face and extending between the front face and the back face, and an extended portion protruding relative to the plurality of top faces. The plurality of top faces includes a first top face extending from the first side face toward the axis of rotation, a second top face extending from the second side face toward the axis of rotation, a third top face extending from the first top face to the extended portion, and a fourth top face extending from the second top face to the extended portion. A distance from the bottom face to the third top face is less than a distance from the bottom face to the first top face. The second top face is angled relative to the fourth top face.

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

Figure 1:
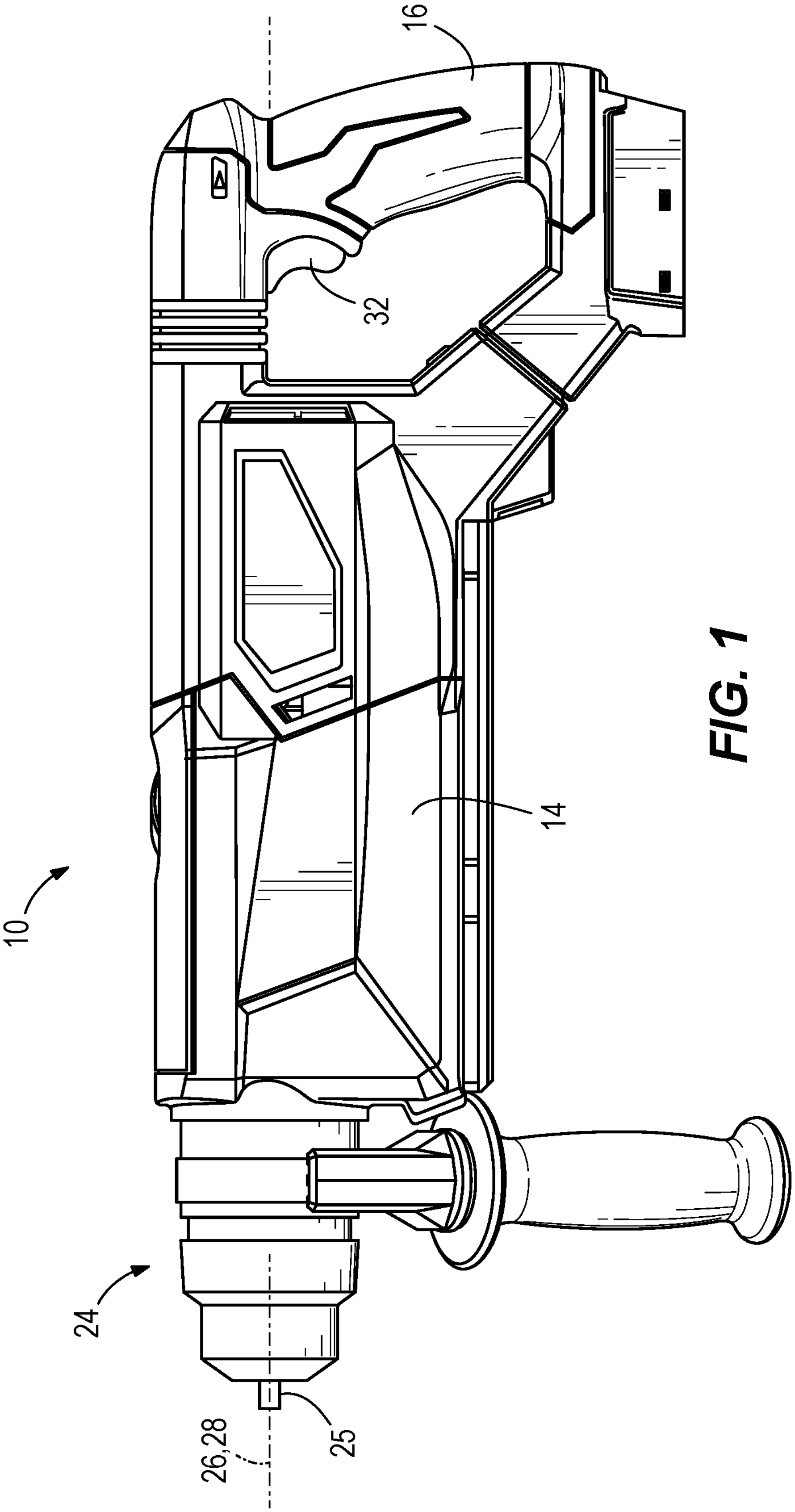
FIG. 1 is a plan view of an impact power tool in accordance with an embodiment of the invention.
Figure 2:
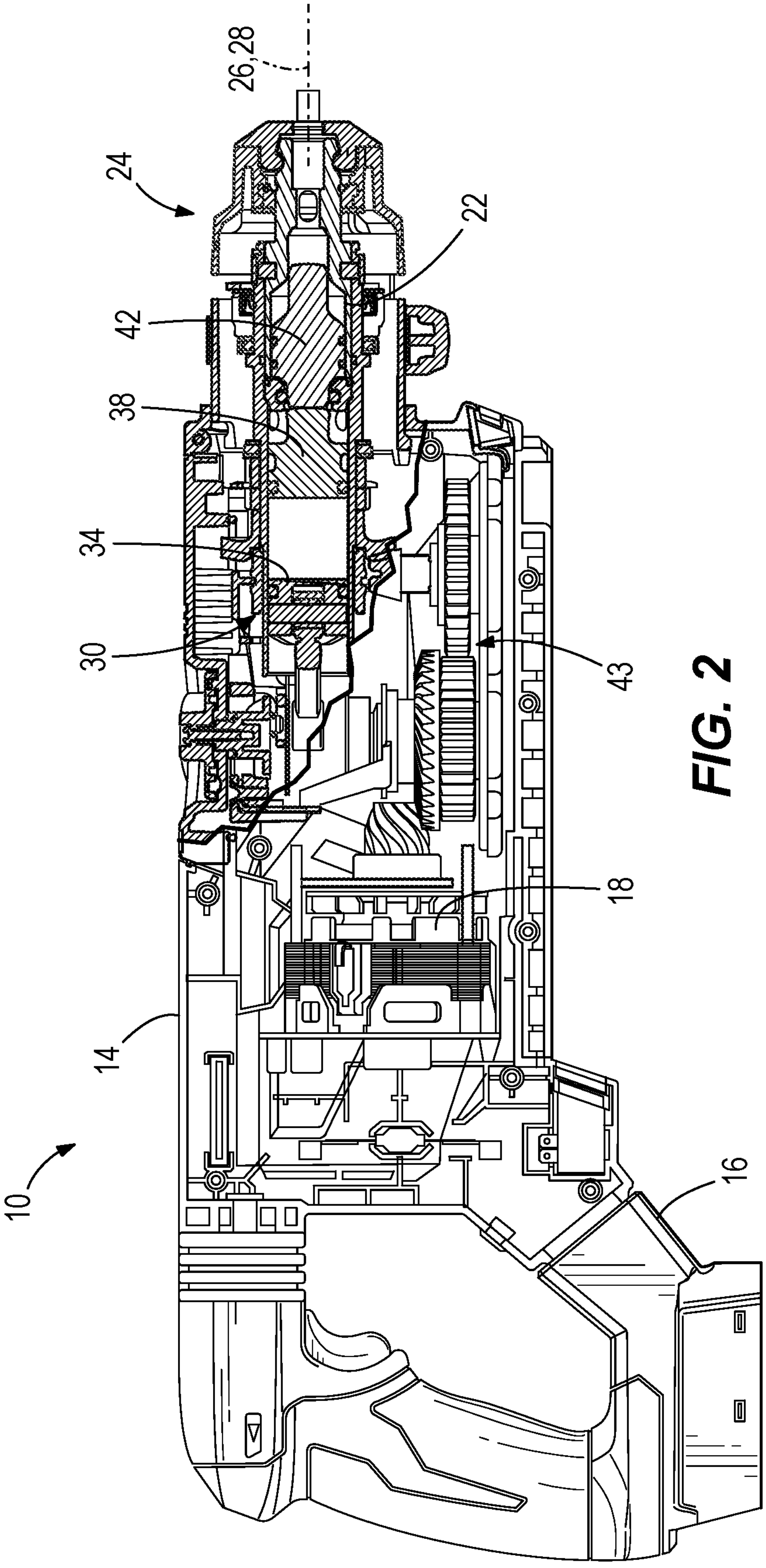
FIG. 2 is a cross-sectional view of the impact power tool of FIG. 1 with portions removed.

FIGS. 1 and 2 illustrate a power tool 10 (e.g., impact power tool, hammer drill, impact drill, etc.). The power tool 10 includes a housing 14 having a D-shaped handle 16, a motor 18 disposed within the housing 14, and a rotatable spindle 22 coupled to the motor 18 for receiving torque from the motor 18. In the illustrated embodiment, the power tool 10 includes a chuck or quick-release mechanism 24 coupled for co-rotation with the spindle 22 to facilitate removal and replacement of different tool bits. A tool bit 25 may include a necked section or a groove in which a detent member of the quick-release mechanism 24 is received to constrain axial movement of the tool bit 25 to the length of the necked section or groove. The power tool 10 defines a tool bit reciprocation axis 26, which in the illustrated embodiment is coaxial with a rotational axis 28 of the spindle 22.

The motor 18 includes a brushless direct current (BLDC) motor that receives power from an on-board power source (e.g., a battery pack). The battery pack may include any of a number of different nominal voltages (e.g., 12V, 18V, etc.), and may be configured having any of a number of different chemistries (e.g., lithium-ion, nickel-cadmium, etc.). In some embodiments, the battery pack is removably coupled to a battery receptacle of the housing 14. Alternatively, the motor 18 may be powered by a remote power source (e.g., a household electrical outlet) through a power cord. The motor 18 is selectively activated by depressing an actuating member, such as a trigger 32, which in turn actuates an electrical switch for activating the motor 18.

With reference to FIG. 2, the power tool 10 further includes a reciprocating impact mechanism 30 having a reciprocating piston 34 disposed within the spindle 22 and a striker 38 that is selectively reciprocable within the spindle 22 in response to a variable pressure air spring. The variable pressure air spring is developed within the spindle 22 by reciprocation of the piston 34. The power tool 10 also includes an anvil 42 that is impacted by the striker 38 when the striker 38 reciprocates toward the tool bit 25. The impact from the striker 38 is then transferred from the anvil 42 to the tool bit 25. Torque from the motor 18 is transferred to the spindle 22 by a transmission 43. The tool bit 25 receives axial impacts such that the tool bit 25 imparts axial impacts onto a workpiece. The axial impacts imparted by the tool bit 25 provide a drilling or breaking operation, which drills or breaks the workpiece. The illustrated power tool 10 is just one example of a power tool. Other types of power tools, or power tools having different configurations (e.g., layouts, impact mechanisms, chucks, etc.), may also be employed.

Figure 3:
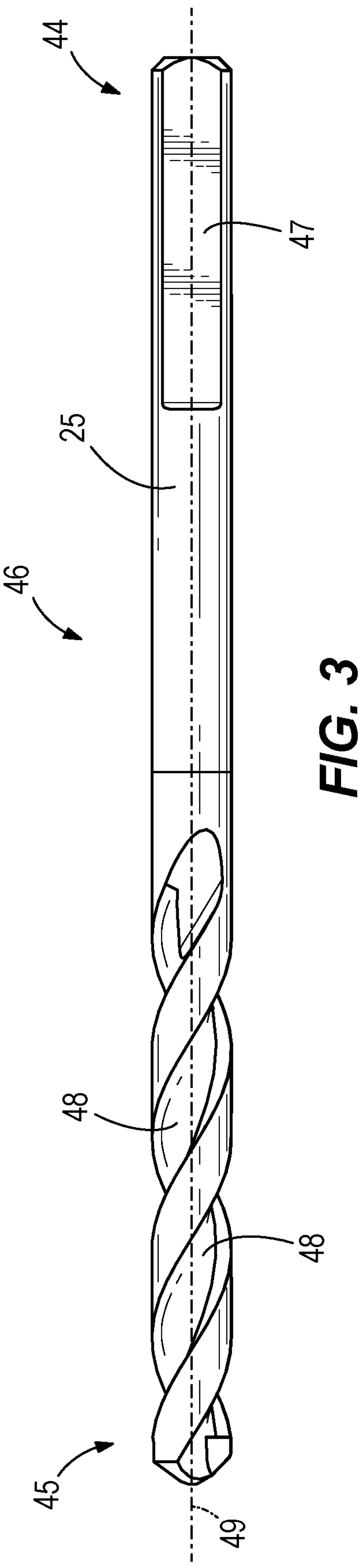
FIG. 3 is a plan view of a tool bit for use with the impact power tool of FIG. 1.

With reference to FIG. 3, in the illustrated embodiment, the tool bit 25 is a twist bit with a first end 44, a second end 45 opposite the first end 44, and a body 46 extending between the first and second ends 44, 45 respectively. The tool bit 25 includes a shank 47 disposed at the first end 44. The shank 47 is configured to be coupled to the power tool 10. In the illustrated embodiment, the shank 47 is a flat shank 47. The flat shank 47 may include a size ranging from ⅝ inch to 1 inch. In one example, the flat shank 47 may be a ⅜ inch. In other embodiments, the shank 47 may be a hex shank with a power groove. In these embodiments, the hex shank may include a size ranging from ⅛ inch to ½ inch. The tool bit 25 also includes a pair of flutes 48 helically wrapped around the body 46. In some embodiments, the tool bit 25 may only include one flute 48. The tool bit 25 defines an axis of rotation 49 that extends centrally through the tool bit 25 between the first and second ends 44, 45 respectively. During operation, the tool bit 25 is configured to rotate about the axis of rotation 49.

Figure 4:
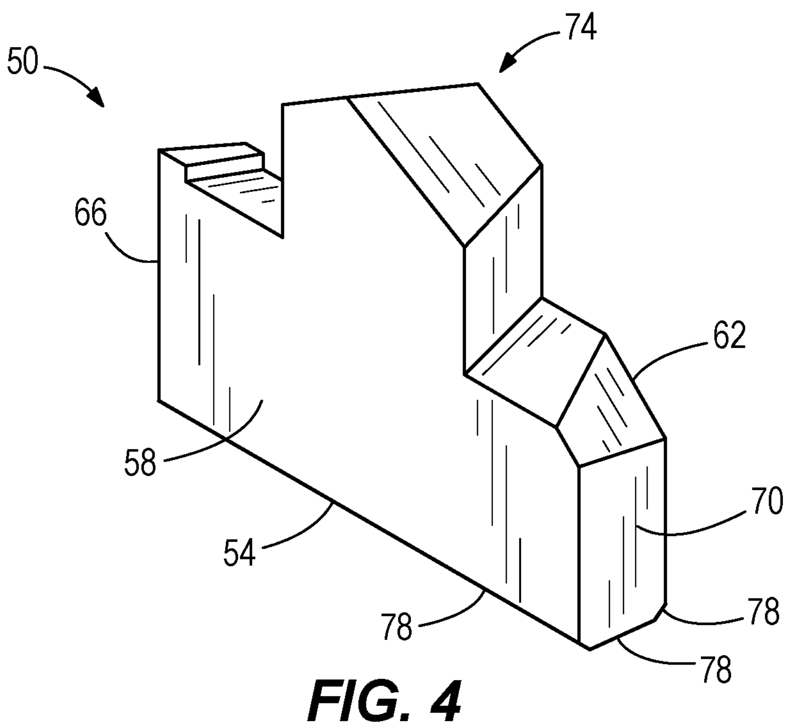
FIG. 4 is a front perspective view of a tip of a tool bit for use with the impact power tool of FIG. 1.
Figure 5:
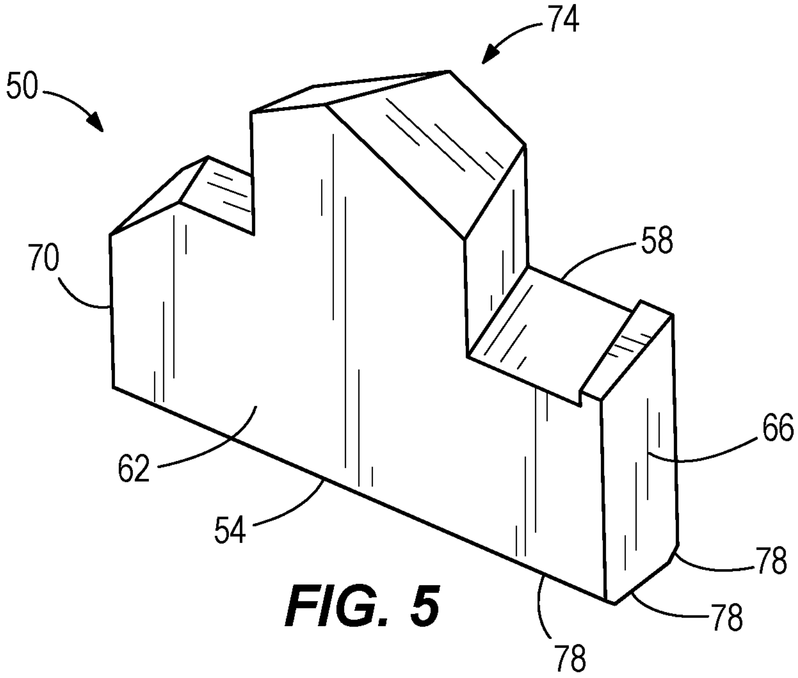
FIG. 5 is a back perspective view of the tip of the tool bit of FIG. 4.

With reference to FIGS. 4 and 5, a tip 50 is coupled to the second end 45 of the tool bit 25 such that the tip 50 engages with the workpiece during the drilling or breaking operation. In some embodiments, the tip 50 may be welded onto the remainder of the tool bit 25. In other embodiments, the tip 50 may be brazed onto the remainder of the tool bit 25. In other embodiments, the tip 50 may be coupled to the remainder of the tool bit 25 through an alternative operation. For example, the tip 50 is coupled to the body 46 of the tool bit 25. The tip 50 is configured to rotate about the axis of rotation 49.

The tip 50 may be composed of a first material, while the remainder of the tool bit 25 may be composed of a second material that is different than the first material. For example, the tip 50 may be composed of carbide or high-speed steel (HSS), while the remainder of the tool bit 25 may be composed of a tool steel. For example, the body 46 is composed of a tool steel. In other embodiments, the tip 50 may be composed of an alternative material.

When rotated, the tip 50 defines a diameter of a hole being cut. In some embodiments, the tip 50 is formed from carbide having a diameter or width of between 0.25 inches and 0.5 inches. In other embodiments, the tip 50 may be formed from carbide having a diameter or width greater than 0.5 inches or less than 0.25 inches. In other embodiments, the tip 50 may be formed from carbide having a diameter or width ranging from ⅛ inch to 1 inch. Still, in other embodiments, the tip 50 may be formed from carbide having a diameter or width ranging from 3 mm to 14 mm.

Figure 6:
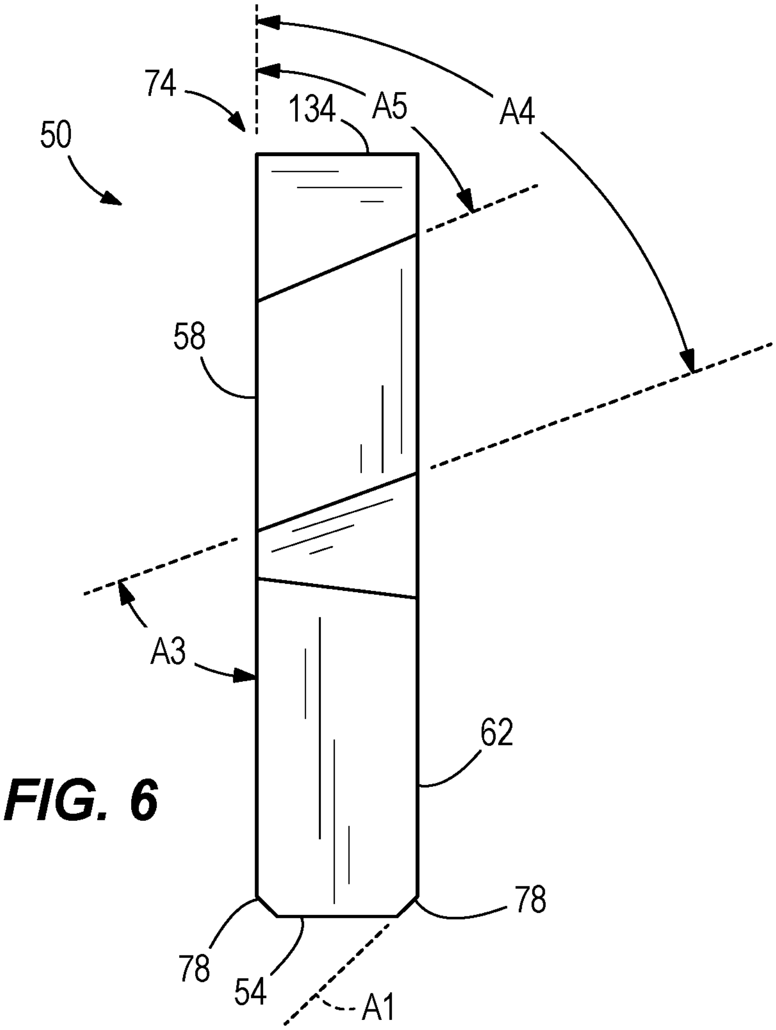
FIG. 6 is a side view of the tip of the tool bit of FIG. 4.

With continued reference to FIGS. 4 and 5, the tip 50 includes a bottom face 54, a front face 58, a back face 62, a first side face 66, a second side face 70, and a plurality of top faces 74. The bottom face 54 engages with the remainder of the tool bit 25. In other words, the bottom face 54 is joined with the remainder of the tool bit 25 such that the tip 50 is integral with the remainder of the tool bit 25. For example, the bottom face 54 is engaged, coupled, or joined with the body 46 of the tool bit 25. The bottom face 54 defines a bottom edge 78 disposed between the bottom face 54 and the front, back, first side face, and second side face 58, 62, 66, 70, respectively. In the illustrated embodiment, the tip 50 includes four bottom edges 78. The bottom edges 78 may be chamfered. The bottom edges 78 are chamfered at an angle A1, where the angle A1 is defined relative to the front face 58 or the back face 62 (FIG. 6). For example, the bottom edges 78 are chamfered at an angle A1 of between 40 degrees and 50 degrees, as shown in FIG. 6. In other embodiments, the bottom edges 78 may not be chamfered. For example, the tip 50 may include two bottom edges 78 that are chamfered and two bottom edges 78 that are not chamfered. In another example, the tip 50 may include four chamfered bottom edges 78.

Figure 7:
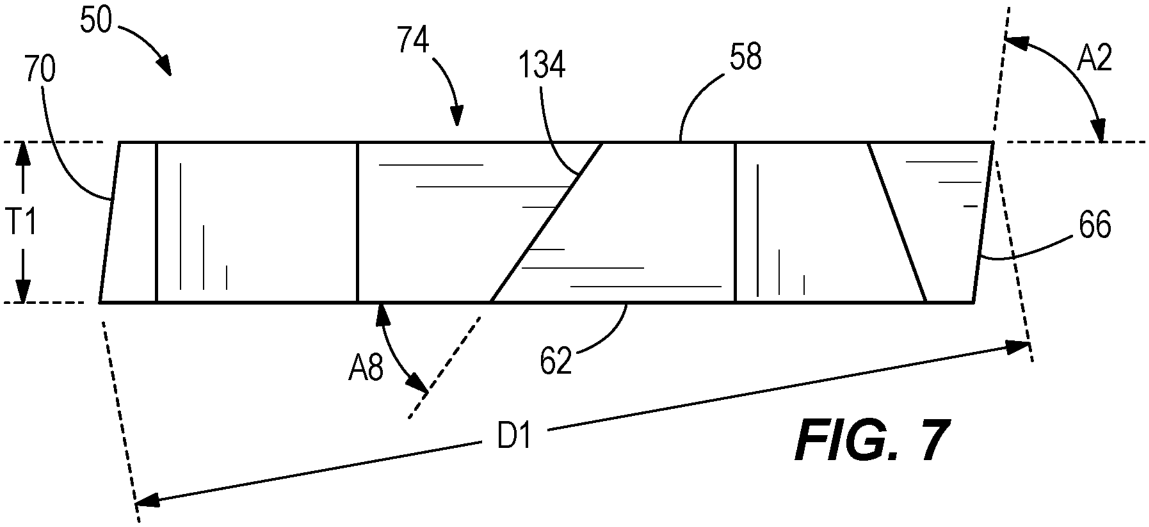
FIG. 7 is a top view of the tip of the tool bit of FIG. 4.
Figure 8:
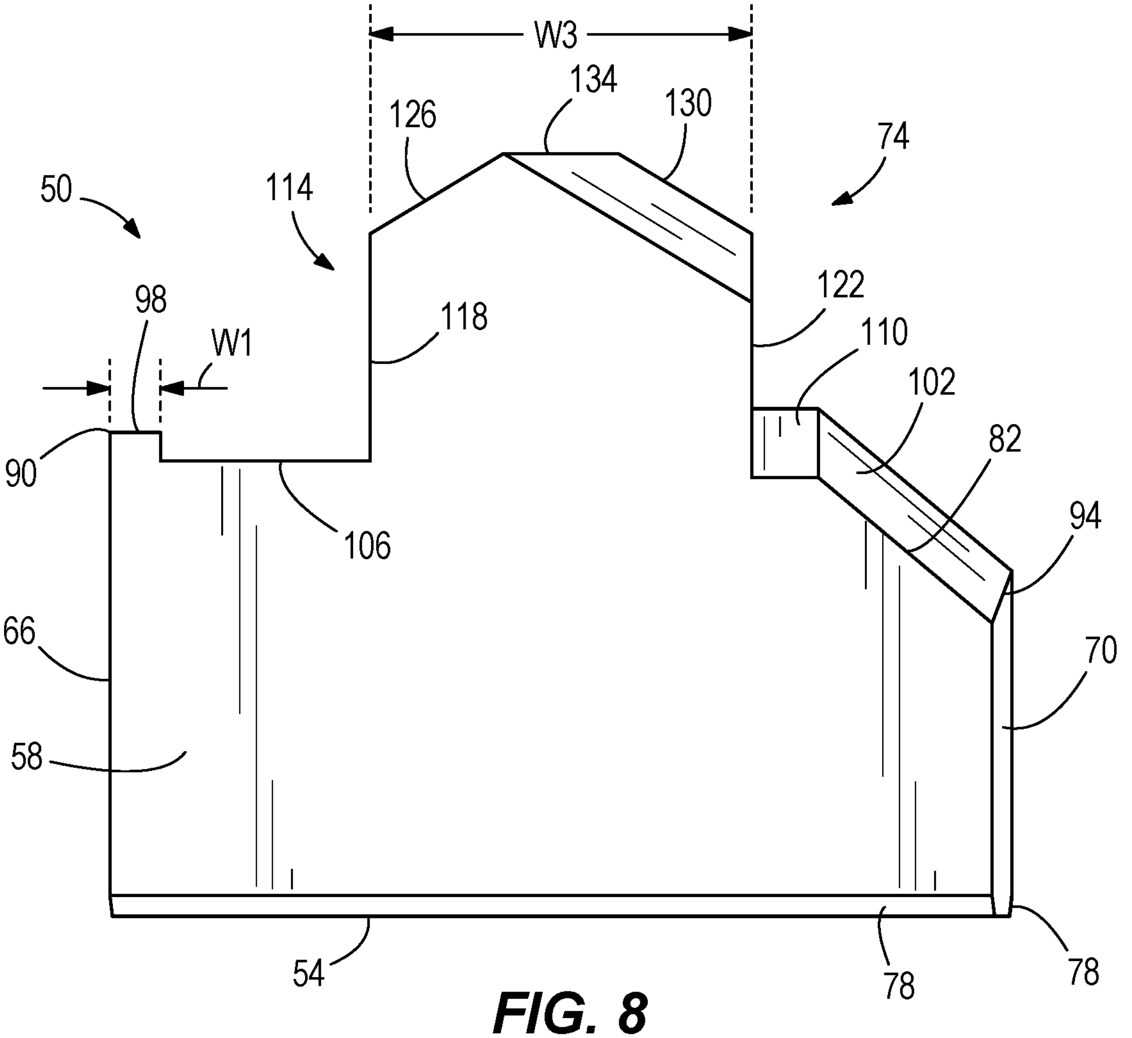
FIG. 8 is a front view of the tip of the tool bit of FIG. 4.
Figure 10:
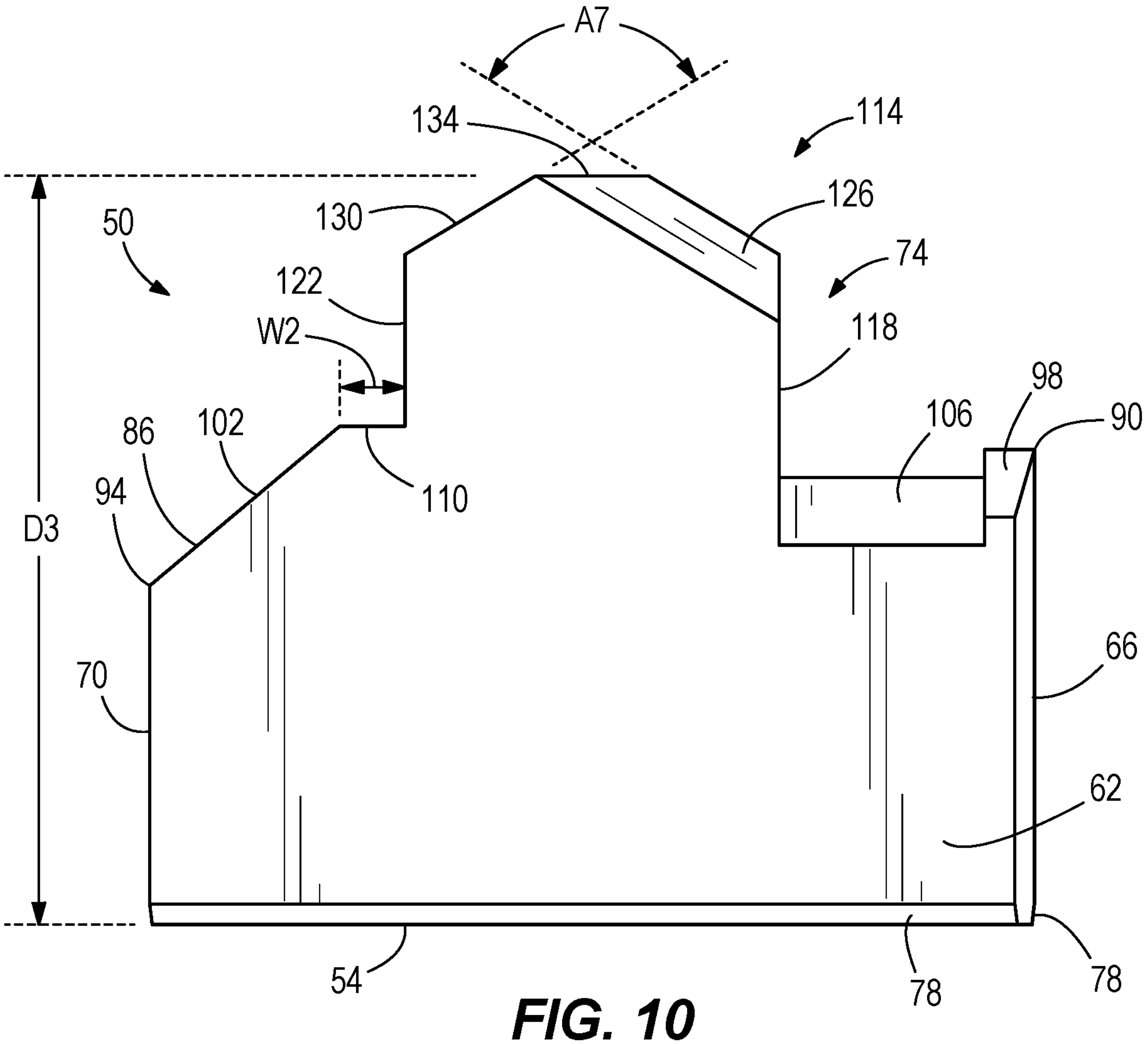
FIG. 10 is a back view of the tip of the tool bit of FIG. 4.

With reference to FIGS. 7, 8, and 10, the front face 58 and the back face 62 are parallel to each other. The front and back faces 58, 62 are perpendicular to the bottom face 54. The front face 58 defines a front edge 82 disposed between the front face 58 and the first and second side faces 66, 70, and the plurality of top faces 74, as shown in FIG. 8. The back face 62 defines a back edge 86 disposed between the back face 62 and the first and second side faces 66, 70, and the plurality of top faces 74, as shown in FIG. 10. A thickness T1 is defined between the front face 58 and the back face 62 of the tip 50, as shown in FIG. 7. The thickness T1 of the tip 50 is between 1.5 mm and 2.5 mm. In some embodiments, the thickness of the tip 50 may be less than 1.5 mm and greater than 2.5 mm. The first and second side faces 66, 70 are parallel to each other.

With reference to FIG. 7, the first side face 66 and the second side face 70 each define an angle A2 relative to the back face 62 in a horizontal direction. The angle A2 defined by the first side face 66 is the same as the angle A2 defined by the second side face 70. The angle A2 is an oblique angle and, more particularly, an acute angle. For example, the angle A2 may between 80 degrees and 85 degrees relative to the back face 62 in the horizontal direction. In other embodiments, the angle A2 may be less than 80 degrees or greater than 85 degrees relative to the back face 62 in the horizontal direction. The first side face 66 defines a first side edge 90 disposed between the first side face 66 and the plurality of top faces 74 (FIG. 8). The second side face 70 defines a second side edge 94 disposed between the second side face 70 and the plurality of top faces 74 (FIG. 8). A distance D1 is defined between a farthest point on the first side edge 90 and a farthest point on the second side edge 94. The distance D1 may be defined between a maximum distance between a point on the first side edge 90 and a point on the second side edge 94. The distance D1 is equal to the diameter or width discussed above. For example, the distance D1 may be between 3 mm and 14 mm. In other embodiments, the distance D1 may be less than 3 mm or greater than 14 mm.

Figure 9:
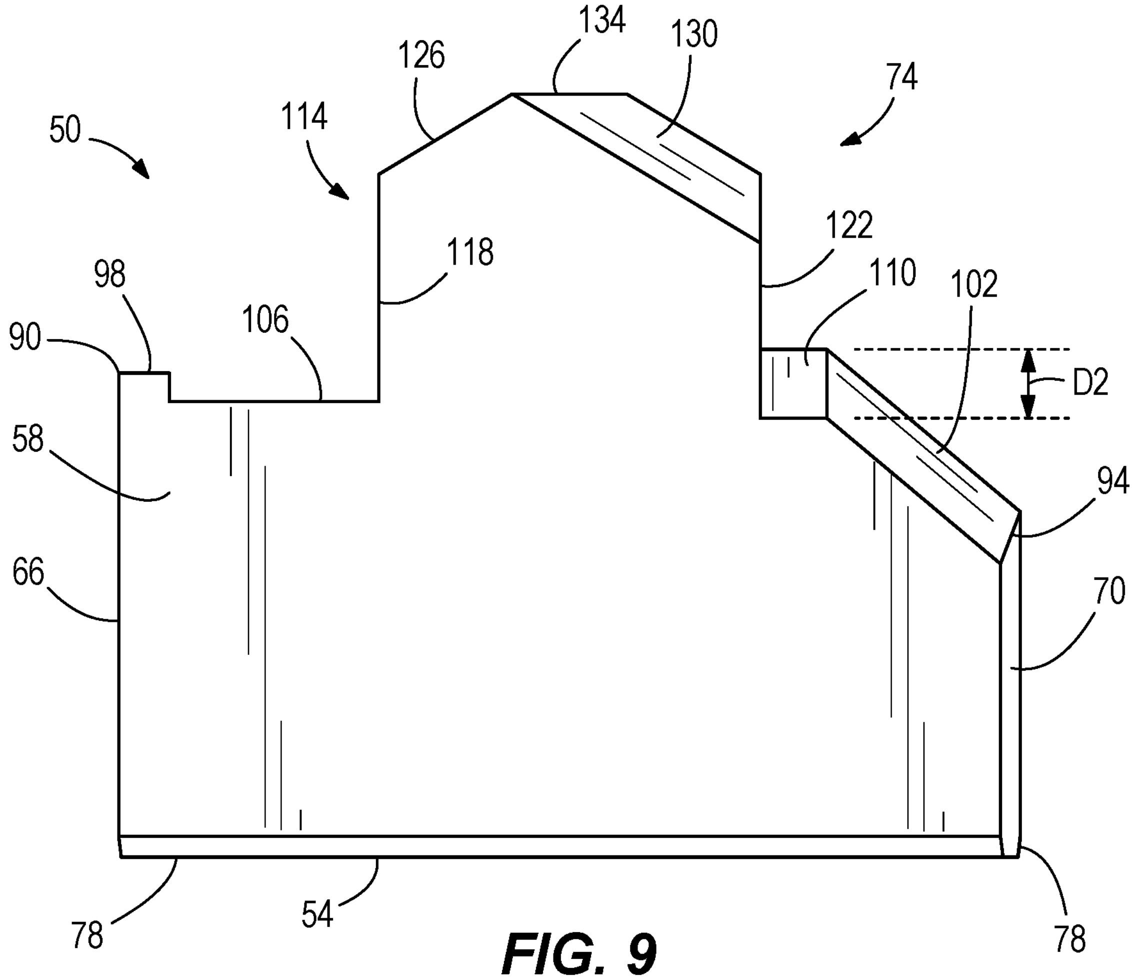
FIG. 9 is another front view of the tip of the tool bit of FIG. 4.

With reference to FIGS. 8-10, in the illustrated embodiment, the plurality of top faces 74 include a first top face 98, a second top face 102, a third top face 106, a fourth top face 110, and an extended portion 114. The top faces 98, 102,

106, 110 are different from each other such that the tip 50 is asymmetric relative to the axis of rotation 49. The extended portion 114 protrudes above or relative to the plurality of top faces 74. In other embodiments, the tip 50 includes at least one top face 74. The first top face 98 is positioned adjacent the first side face 66. The first top face 98 extends from the first side face 66 toward the axis of rotation 49. The first top face 98 is perpendicular to the axis of rotation 49 when viewing the tip 50 in a front view. The first top face 98 defines an angle that may be less than 90 degrees relative to the back face 62 in a vertical direction, as shown in FIG. 10. In other words, the first top face 98 is not perpendicular relative to the back face 62. The first top face 98 defines a maximum width W1 between the first side face 66 and the third top face 106, as shown in FIG. 8. For example, the maximum width W1 may be between 0.01 inches and 0.07 inches. In other embodiments, the maximum width W1 of the first top face 98 may be less than 0.01 inches or greater than 0.07 inches. In the illustrated embodiment, a width of the top face 98 also tapers from the front face 58 to the back face 62. That is, the width of the top face 98 gets smaller as the top face 98 extends from the front face 58 to the back face 62. In the illustrated embodiment, the taper is a constant, linear taper. In other embodiments, the taper may be non-linear (e.g., stepped, exponential, curved, etc.).

With reference to FIGS. 8 and 10, the third top face 106 is adjacent to the first top face 98. The third top face 106 extends from the first top face 98 to the extended portion 114. The third top face 106 is perpendicular to the axis of rotation 49 when viewing the tip 50 in a front view. The third top face 106 is positioned between the first top face 98 and the extended portion 114. The third top face 106 is stepped down or recessed relative to the first top face 98. In other words, a distance between the first top face 98 and the bottom face 54 is greater than a distance between the third top face 106 and the bottom face 54. The third top face 106 defines an angle that is less than 90 degrees relative to the back face 62 in the vertical direction, as shown in FIG. 10. In some embodiments, the third top face 106 and the first top face 98 define the same angle relative to the back face 62. In other embodiments, the third top face 106 and the first top face 98 may each define a different angle relative to the back face 62. The third top face 106 may define a first or primary cutting edge for the tip 50. The third top face 106 may be the primary face used to perform the drilling or breaking operation.

With reference to FIGS. 6 and 8, the second top face 102 is adjacent to the second side face 70. The second top face 102 extends from the second side face 70. The second top face 102 is angled relative to the fourth top face 110. The second top face 102 is obliquely angled relative to the axis of rotation 49 when viewing the tip 50 in a back view. For example, the second top face 102 may define an angle A3 between 65 degrees and 80 degrees relative to the front face 58 in the vertical direction (FIG. 6). In other embodiments, the angle A3 may be less than 65 degrees or greater than 80 degrees relative to the front face 58 in the vertical direction. The second top face 102 is angled in a direction that is opposite to a direction in which the first and third top faces 98, 106 are angled. The second top face 102 defines an angle that is greater than 90 degrees relative to the second side face 70 in a third direction. The third direction is different than the vertical direction and the horizontal direction. The second top face 102 may define a second or secondary cutting edge for the tip 50. The second top face 102 is the secondary face used to perform the drilling or breaking operation. In other embodiments, the tip 50 may include more or less top faces 74 that define cutting edges used to perform the drilling or breaking operation (e.g., one, two, three, or four cutting edges).

The fourth top face 110 is adjacent to the second top face 102. The fourth top face 110 extends from the second top face 102 to the extended portion 114. The fourth top face 110 is perpendicular to the axis of rotation 49 when viewing the tip 50 in a back view. The fourth top face 110 is positioned between the second top face 102 and the extended portion 114. The fourth top face 110 defines an angle A4 between 60 degrees and 75 degrees relative to the front face 58 in the vertical direction (FIG. 6). In other embodiments, the angle A4 may be less than 60 degrees or greater than 75 degrees relative to the front face 58 in the vertical direction. As shown in FIG. 9, a distance D2 is defined between the back edge 86 at the fourth top face 110 and the front edge 82 at the third top face 106. For example, the distance D2 may be between 0.01 inches and 0.04 inches. In other embodiments, the distance D2 may be greater than 0.04 inches or less than 0.01 inches. The fourth top face 110 defines a width W2 between the second top face 102 and the extended portion 114, as shown in FIG. 10. The width W2 is between 0.01 inches and 0.08 inches. In other embodiments, the width W2 may be more than 0.08 inches or less than 0.01 inches.

With reference to FIGS. 8-10, the extended portion 114 includes a first vertical face 118, a second vertical face 122, a first angled face 126, and a second angled face 130. The extended portion 114 may also be referred to as a pilot tip. The first vertical face 118 is adjacent to the third top face 106. The first vertical face 118 extends from the third top face 106. The first vertical face 118 is parallel to the axis of rotation 49 when viewing the tip in a front view. The second vertical face 122 is adjacent to the fourth top face 110. The second vertical face 122 extends from the fourth top face 110. The second vertical face 122 is parallel to the axis of rotation 49 when viewing the tip 50 in a front view. The first and second vertical faces 118, 122 extend perpendicular relative to the front and back faces 58, 62, and the bottom face 54. In other words, the first and second vertical faces 118, 122 extend parallel to the axis of rotation 49 (FIG. 3). As shown in FIG. 8, a width W3 is defined between the first vertical face 118 and the second vertical face 122. For example, the width W3 may be between 2.5 mm and 6 mm. In other embodiments, the width W3 may be more than 6 mm or less than 2.5 mm.

With continued reference to FIGS. 9 and 10, the first angled face 126 is adjacent to the first vertical face 118. The first angled face 126 extends from the first vertical face 118. The first angled face 126 is obliquely angled relative to the axis of rotation 49 when viewing the tip 50 in a front view. The first angled face 126 defines an angle of less than 90 degrees relative to the first vertical face 118 in the third direction (i.e., third direction is different than the horizontal and vertical direction). The horizontal direction may extend between the first side face 66 and the second side face 70 when viewing the tip 50 in a top view (i.e., viewed perpendicular to the plurality of top faces 74). The vertical direction may extend between the bottom face 54 and the plurality of top faces 74 when viewing the tip 50 in a side view (i.e., viewed perpendicular to the first side face 66 or the second side face 70). The third direction may extend between the first side face 66 and the second side face 70 when viewing the tip 50 in a side view (i.e., viewed perpendicular to the first side face 66 or second side face 70). The first angled face 126 defines an angle A5 between 60 degrees and 75 degrees relative to the back face 62 in the vertical direction (FIG. 6). In other embodiments, the angle A5 may be less than 60 degrees or greater than 75 degrees relative to the back face 62 in the vertical direction. The second angled face 130 is adjacent to the second vertical face 122. The second angled face 130 extends from the second vertical face 122. The second angled face 130 is obliquely angled relative to the axis of rotation 49 when viewing the tip 50 in a back view. The second angled face 130 defines an angle of less than 90 degrees relative to the second vertical face 122 in the third direction. In some embodiments, the angle defined by the second angled face 130 may be the same as the angle defined by the first angled face 126 in the third direction. In other embodiments, the angle defined by the second angled face 130 may be different than the angle defined by the first angled face 126. The second angled face 130 defines an angle A5 between 60 degrees and 75 degrees relative to the front face 58 in the vertical direction. In other embodiments, the angle A5 may be less than 60 degrees or greater than 75 degrees relative to the front face 58 in the vertical direction. The first angled face 126 is angled in a direction opposite to a direction in which the second angled face 130 is angled.

As shown in FIG. 10, an angle A7 is defined between the front edge 82 at the first angled face 126 and the back edge 86 at the second angled face 130. For example, the angle A7 may be between 115 degrees and 125 degrees. In other embodiments, the angle A7 may be greater than 125 degrees or less than 115 degrees. An intersection of the first angled face 126 and the second angled face 130 defines a tip edge 134. The tip edge 134 defines a farthest most point on the tip 50 relative to the bottom face 54. The tip edge 134 may define an angle A8 between 50 degrees and 60 degrees relative to the back face 62 (or the front face 58) in the horizontal direction (FIG. 7). In some embodiments, the angle A8 may be greater than 60 degrees or less than 50 degrees. The tip edge 134 is parallel with the bottom face 54. A distance D3 is defined between the tip edge 134 and the bottom edge 78 (FIG. 10). For example, the distance D3 may be between 5 mm and 12 mm. In other embodiments, the distance D3 may be greater than 12 mm or less than 5 mm.

Although the invention has been described in detail with reference to certain preferred embodiments, variations and modifications exist within the scope and spirit of one or more independent aspects of the invention as described.

Various features of the invention are set forth in the following claims.

What is claimed is:

1. A tool bit comprising:
- a body formed from a first material and defining an axis of rotation; and
- a tip coupled to the body and formed from a second material different than the first material, the tip including:
  - a bottom face joined to the body,
  - a front face,
  - a back face opposite the front face,
  - a first side face extending between the front face and the back face and facing in a first direction,
  - a second side face opposite the first side face, extending between the front face and the back face, and facing in a second direction that is opposite the first direction, and
  - a plurality of top faces opposite the bottom face and extending between the front face and the back face, the plurality of top faces including a first top face extending from the first side face toward the axis of rotation and a second top face extending from the second side face toward the axis of rotation, the first top face is perpendicular to the axis of rotation, the second top face is obliquely angled relative to the axis of rotation.

2. The tool bit of claim 1, wherein the tip includes an extended portion protruding relative to the plurality of top faces and extending parallel to the axis of rotation.

3. The tool bit of claim 2, wherein the plurality of top faces includes a third top face extending from the first top face to the extended portion, and a fourth top face extending from the second top face to the extended portion.

4. The tool bit of claim 3, wherein the extended portion includes a first vertical face extending from the third top face and a second vertical face extending from the fourth top face, wherein the first vertical face is parallel to the axis of rotation, and wherein the second vertical face is parallel to the axis of rotation.

5. The tool bit of claim 4, wherein the extended portion includes a first angled face extending from the first vertical face and a second angled face extending from the second vertical face, wherein the first angled face is angled relative to the first vertical face, and wherein the second angled face is angled relative to the second vertical face.

6. The tool bit of claim 3, wherein the third top face is perpendicular to the axis of rotation, and wherein the fourth top face is perpendicular to the axis of rotation.

7. The tool bit of claim 1, wherein the first material is a carbide, and wherein the second material is a tool steel.

8. The tool bit of claim 1, wherein the bottom face extends between the front face and the back face, and wherein the bottom face includes a chamfered edge.

9. A tip for use with a tool bit having an axis of rotation, the tip comprising:
- a bottom face configured to be joined to the tool bit;
- a front face;
- a back face opposite the front face;
- a first side face extending between the front face and the back face and facing in a first direction;
- a second side face opposite the first side face, extending between the front face and the back face, and facing in a second direction opposite the first direction; and
- a plurality of top faces opposite the bottom face and extending between the front face and the back face, the plurality of top faces including a first top face extending from the first side face toward the axis of rotation and a second top face extending from the second side face toward the axis of rotation, the first top face is perpendicular to the axis of rotation, the second top face is obliquely angled relative to the axis of rotation.

10. The tip of claim 9, further comprising an extended portion protruding relative to the plurality of top faces.

11. The tip of claim 10, wherein the plurality of top faces includes a third top face extending from the first top face to the extended portion, and a fourth top face extending from the second top face to the extended portion.

12. The tip of claim 11, wherein the third top face is perpendicular to the axis of rotation and the fourth top face is perpendicular to the axis of rotation.

13. The tip of claim 11, wherein the extended portion includes a first vertical face extending from the third top face, a second vertical face extending from the fourth top face, a first angled face extending from the first vertical face, and a second angled face extending from the second vertical face, wherein the first vertical face is parallel to the axis of rotation, wherein the second vertical face is parallel to the axis of rotation, wherein the first angled face is angled relative to the first vertical face, and wherein the second angled face is angled relative to the second vertical face.

14. The tip of claim 9, wherein the tip is formed from a carbide material.

15. A tip for use with a tool bit having an axis of rotation, the tip comprising:

a bottom face configured to be joined to the tool bit;

a front face;

a back face opposite the front face;

a first side face extending between the front face and the back face;

a second side face opposite the first side face and extending between the front face and the back face;

a plurality of top faces opposite the bottom face and extending between the front face and the back face; and an extended portion protruding relative to the plurality of top faces;

wherein the plurality of top faces includes a first top face extending from the first side face toward the axis of rotation, a second top face extending from the second side face toward the axis of rotation, a third top face extending from the first top face to the extended portion, and a fourth top face extending from the second top face to the extended portion;

wherein a distance from the bottom face to the third top face is less than a distance from the bottom face to the first top face; and wherein the second top face is angled relative to the fourth top face.

16. The tip of claim 15, wherein the extended portion includes a first vertical face extending from the third top face and a second vertical face extending from the fourth top face, wherein the first vertical face is parallel to the axis of rotation, and wherein the second vertical face is parallel to the axis of rotation.

17. The tip of claim 16, wherein the extended portion includes a first angled face extending from the first vertical face and a second angled face extending from the second vertical face, wherein the first angled face is angled relative to the first vertical face, and wherein the second angled face is angled relative to the second vertical face.

18. The tip of claim 15, wherein the tip is formed from a carbide material.

19. The tip of claim 15, wherein the first top face is perpendicular to the axis of rotation, and the third top face is perpendicular to the axis of rotation.

20. The tip of claim 15, wherein the fourth top face is perpendicular to the axis of rotation, and wherein the second top face is obliquely angled relative to the axis of rotation.

* * * * *